United States Patent
Wang et al.

(10) Patent No.: US 9,406,942 B2
(45) Date of Patent: Aug. 2, 2016

(54) ELECTROCATALYST ROTATING DISK ELECTRODE PREPARATION APPARATUS

(75) Inventors: Chunmei Wang, Farmington Hills, MI (US); Nilesh Dale, Farmington Hills, MI (US); Kevork Adjemian, Birmingham, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 1072 days.

(21) Appl. No.: 13/534,845

(22) Filed: Jun. 27, 2012

(65) Prior Publication Data

US 2014/0004474 A1   Jan. 2, 2014

(51) Int. Cl.
| F27B 5/16 | (2006.01) |
| C22C 5/00 | (2006.01) |
| C22C 5/04 | (2006.01) |
| B01J 21/18 | (2006.01) |
| B01J 23/40 | (2006.01) |
| B01J 23/74 | (2006.01) |
| B01J 23/00 | (2006.01) |
| B01J 21/00 | (2006.01) |
| B01J 20/00 | (2006.01) |
| H01M 4/88 | (2006.01) |
| H01M 4/00 | (2006.01) |
| H01M 8/00 | (2016.01) |

(52) U.S. Cl.
CPC .............. *H01M 4/8828* (2013.01); *H01M 4/88* (2013.01); *Y02E 60/50* (2013.01)

(58) Field of Classification Search
None
See application file for complete search history.

(56) References Cited

U.S. PATENT DOCUMENTS

| 2,218,165 A * | 10/1940 | Gaebel | G03F 7/162 118/50 |
| 3,852,041 A * | 12/1974 | Moore | F01N 3/2846 422/176 |
| 4,639,303 A * | 1/1987 | Staab | C25B 9/04 204/258 |
| 6,251,238 B1 * | 6/2001 | Kaufman | H01L 21/2885 204/242 |
| 6,306,658 B1 * | 10/2001 | Turner | B01F 15/00207 374/E13.001 |
| 6,344,084 B1 * | 2/2002 | Koinuma | B01J 19/0046 117/108 |
| 6,455,316 B1 * | 9/2002 | Turner | B01F 15/00207 374/E13.001 |
| 7,125,822 B2 * | 10/2006 | Nakano | H01M 4/8605 429/524 |
| 7,498,286 B2 | 3/2009 | Manthiram et al. | |
| 7,994,089 B2 | 8/2011 | Strasser et al. | |
| 2003/0157721 A1 * | 8/2003 | Turner | B01F 15/00201 436/148 |
| 2004/0112761 A1 * | 6/2004 | Saito | B01J 49/0052 205/688 |
| 2005/0034664 A1 * | 2/2005 | Koh | C23C 16/455 118/719 |
| 2007/0137679 A1 * | 6/2007 | Rye | C25D 17/06 134/94.1 |

(Continued)

OTHER PUBLICATIONS

Garsany, Yannick, et. al., "Impact of Film Drying Procedures on RDE Characterization of Pt/VC Electrocatalysts", Journal of Electroanalytical Chemistry 662 (2011), pp. 396-406, Sep. 28, 2011.

(Continued)

*Primary Examiner* — Gregory Huson
*Assistant Examiner* — Eric Gorman
(74) *Attorney, Agent, or Firm* — Young Basile Hanlon & MacFarlane, P.C.

(57) ABSTRACT

Disclosed herein are embodiments of an apparatus for preparing rotating disk electrodes. One such apparatus comprises a base, a plurality of disk mounts attached to the base, each configured to receive a respective rotating disk, a plurality of motors each coupled to a corresponding one of the plurality of disk mounts and configured to rotate the corresponding one of the plurality of disk mounts and a controller configured to individually operate each of the plurality of motors.

20 Claims, 5 Drawing Sheets

(56) References Cited

U.S. PATENT DOCUMENTS

| | | | |
|---|---|---|---|
| 2008/0011334 A1* | 1/2008 | Rye | H01L 21/67051 134/95.1 |
| 2009/0038315 A1* | 2/2009 | Johnson | H01M 14/00 60/783 |
| 2010/0319615 A1* | 12/2010 | Higashijima | H01L 21/6708 118/50 |
| 2012/0186994 A1* | 7/2012 | DiLeo | F16K 37/00 205/775 |
| 2013/0104940 A1* | 5/2013 | Nagamine | H01L 21/6715 134/30 |
| 2013/0157153 A1* | 6/2013 | Niangar | H01M 8/0662 429/414 |
| 2013/0158757 A1* | 6/2013 | Han | H01M 8/04664 701/22 |

OTHER PUBLICATIONS

Garsany, Yannick, et. al., "Experimental Methods for Quantifying the Activity of Platinum Electrocatalysts for the Oxygen Reduction Reaction", Analytical Chemistry 82 (2010), pp. 6321-6328, Aug. 1, 2010.

Deegan, R.D., et. al., "Capillary Flow as the Cause of Ring Stains from Dried Liquid Drops", Nature 389 (1997), pp. 827-829, Oct. 23, 1997.

Munekata, Mizue, et. al., "Drying of Flowing Liquid Film on Rotating Disk", Journal of Thermal Science vol. 19, No. 3 (2010), pp. 234-238, Nov. 2009.

Paulus, U.A., et. al., "Oxygen reduction on a high-surface area Pt/Vulcan carbon catalyst: a thin-film rotating ring-disk electrode study", Journal of Electroanalytical Chemistry 495 (2001), pp. 134-145, Aug. 25, 2000.

Merzougui, Belabbes, et. al., "Rotating Disk Electrode Investigations of Fuel Cell Catalyst Degradation Due to Potential Cycling in Acid Electrolyte", Journal of the Electrochemical Society, 153 (12) A2220-A2226 (2006), Oct. 11, 2006.

Rand, D.A.J., et. al., "A Study of the Dissolution of Platinum, Palladium, Rhodium and Gold Electrodes in 1 M Sulphuric Acid by Cyclic Voltammetry", Journal of Electroanalytical Chemistry and Interfacial Electrochemistry, 35 (1972), pp. 209-219, Aug. 17, 1971.

* cited by examiner

ELECTROCATALYST ROTATING DISK ELECTRODE PREPARATION APPARATUS

TECHNICAL FIELD

The disclosure relates in general to an apparatus for preparing electrocatalyst rotating disk electrodes.

BACKGROUND

To assist in the prediction of performance trends of catalyst used in fuel cells, activity and durability of catalysts can be measured in an electrochemical cell. Typically, the catalyst is tested as a thin-film cast on a rotating disk electrode. The optimum results are obtained when the thin-film is uniform across the surface of the disk with no surface irregularities. Conventional procedures to prepare the electrodes do not result in a uniform thin-film, thus reducing the accuracy of the testing results.

SUMMARY

Disclosed herein are embodiments of an apparatus for preparing rotating disk electrodes. One such apparatus comprises a base, a plurality of disk mounts attached to the base, each configured to receive a respective rotating disk, a plurality of motors each coupled to a corresponding one of the plurality of disk mounts and configured to rotate the corresponding one of the plurality of disk mounts and a controller configured to individually operate each of the plurality of motors.

Another embodiment of an apparatus for preparing rotating disk electrodes disclosed herein comprises a base, a disk mount attached to the base and configured to receive a rotating disk, a motor coupled to the disk mount and configured to rotate the disk mount and a hood overlaying and in sealing engagement with the base and having a cavity within which the disk mount is located. The hood can have a gas inlet located on the hood, a gas outlet located on the hood and a gas supply coupled to the gas inlet.

It should be noted that two or more of the embodiments described herein, including those described above, may be combined to produce one or more additional embodiments which include the combined features of the individual embodiments.

These and other aspects of the present disclosure are disclosed in the following detailed description of the embodiments, the appended claims and the accompanying figures.

BRIEF DESCRIPTION OF THE DRAWINGS

The various features, advantages and other uses of the present apparatus will become more apparent by referring to the following detailed description and drawing in which.

DETAILED DESCRIPTION

A rotating disk electrode (RDE) is a hydrodynamic working electrode used in a three electrode system. The electrode rotates during experiments inducing a flux of analyte to the electrode. These working electrodes are used in electrochemical studies when investigating reaction mechanisms related to redox chemistry, among other chemical phenomena. The more complex rotating ring-disk electrode can be used as a rotating disk electrode if the ring is left inactive during the experiment.

Figure 1:
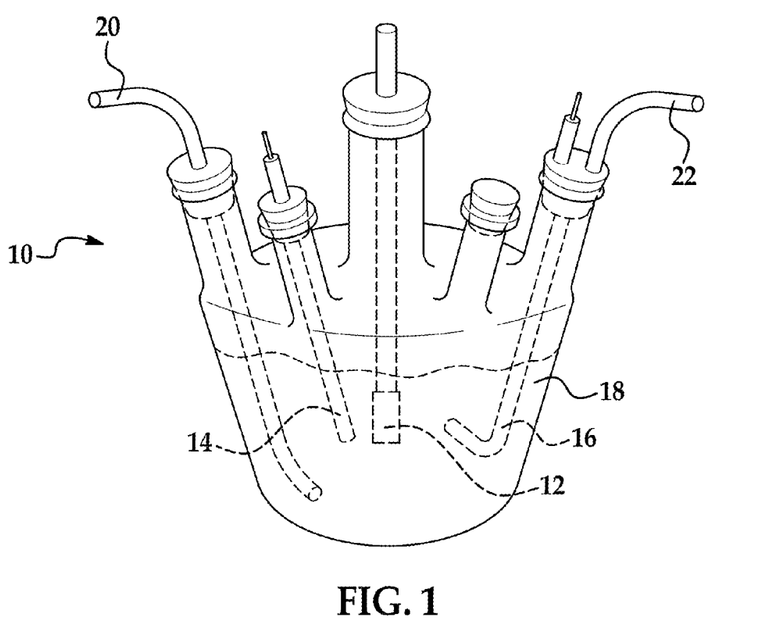
FIG. 1 is a perspective view of an exemplary test apparatus using a rotating disk electrode.

As a non-limiting example, FIG. 1 illustrates one such use of a rotating disk electrode. The testing apparatus in FIG. 1 is a three-electrode electrochemical cell 10. The three-electrode electrochemical cell 10 comprises a working electrode 12, shown here as a rotating-disk electrode, a counter electrode 14, and a reference electrode 16. The three-electrode electrochemical cell 10 is filled to a predetermined level with a liquid electrolyte 18. Fluid 20 is bubbled into the liquid electrolyte 18. Fluid 22 can be delivered to the reference electrode 16. The rotating-disk electrode 12 is rotated to provide stirring to the liquid electrolyte 18. In very general terms, an electric current is established between the working electrode 12 and the counter electrode 14. The electric potential (or difference in voltage) between the working electrode 12 and the counter electrode 14 due to the flow of current can then be measured. The reference electrode 16 generates a known voltage from which the actual value of the electric potential generated by working electrode 12 can be determined. The liquid electrolyte 18 can be tested for the precious metal used in the catalyst to determine durability of the catalyst, for example, with a larger amount of precious metal detected in the liquid electrolyte 18 indicating a less durable catalyst.

Figures 2, 3:
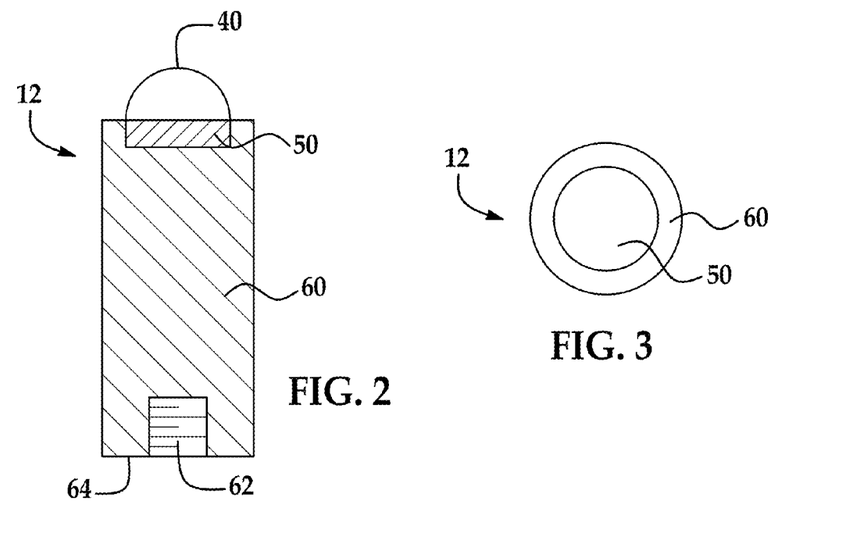
FIG. 2 is a cross-sectional side view of a rotating disk electrode.
FIG. 3 is a top plan view of a rotating disk electrode.

To prepare a rotating disk electrode such as rotating disk electrode 12, a rotating ring disk electrode, or other rotating electrodes, a catalyst ink drop 40 is placed on a disk electrode 50 as shown in FIG. 2. The disk electrode 50 is embedded in a cylinder 60 of a non-reacting material, such as Teflon®. FIG. 3 is a plan view of the rotating disk electrode 12 illustrating the disk electrode 50 embedded in the cylinder 60 such that the disk electrode 50 is bordered by the non-reacting material. Disk electrodes 50 can be glassy carbon electrodes with a diameter of 5-6 mm; however, the disk electrode 50 is not restricted to a particular material, size, or shape. Precious metals, like gold and platinum, are common alternative materials for the disk electrode 50. Similarly, as depicted, the cylinder 60 can be Teflon® with a diameter slightly larger than that of the disk electrode 50; however, other non-reactive insulating materials, sizes and shapes may also be suitable.

As a non-limiting example, the catalyst ink drop 40 can be about 10-20 μL of a mixture comprising catalyst, water, alcohol and ionomer such as Nafion. Using a conventional stationary drying approach, the catalyst ink drop 40 placed on the disk electrode 50 will maintain its semi-spherical shape due to surface tension as it dries. This can lead to undesirable defects and/or non-uniform film thicknesses.

Figure 4A:
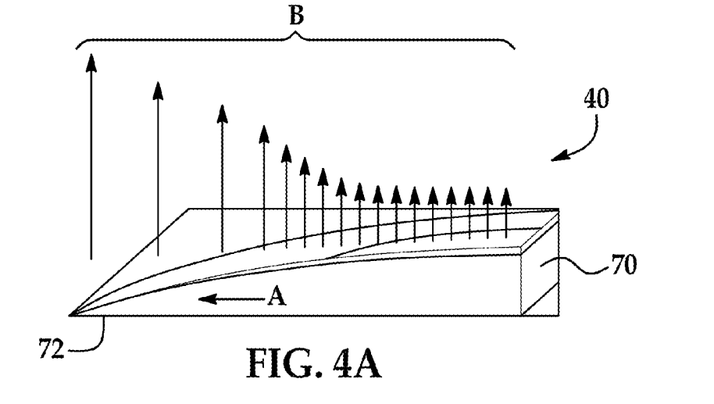
FIG. 4A is a cut away view of a catalyst ink drop in a stationary environment.

FIG. 4A is an illustration of a catalyst ink drop 40 undergoing stationary drying. As shown in FIG. 4A, the liquid concentration of the catalyst ink drop 40 is highest in the center 70 and decreased toward the perimeter 72, as shown by arrow A, where the liquid concentration is lowest. The evaporating flux, shown as arrows B, is stronger as the liquid concentration decreases. As the liquid of the catalyst ink drop 40 is evaporated, the dried catalyst is left behind. As the liquid of the catalyst ink drop 40 proximal the perimeter 72 dries due to evaporation, liquid from the center 70 will flow over the dried catalyst due to capillary movement. This occurs throughout the drying process until all of the liquid is removed. The resulting dried catalyst is heavier around the perimeter 72, forming a ring of catalyst, and lighter toward the center 70. This non-uniform catalyst film presents inaccuracies in the testing in which the rotating disk electrode 12 is used, as catalyst activity cannot be accurately measured and testing cannot be accurately reproduced.

Figure 4B:
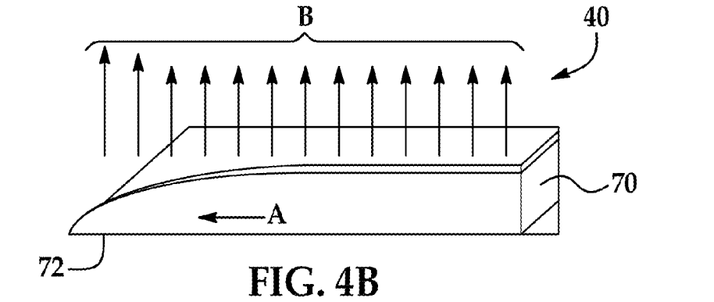
FIG. 4B is a cut away view of a catalyst ink drop in a rotating environment.

FIG. 4B is an illustration of a catalyst ink drop 40 undergoing rotational drying using an apparatus as disclosed herein. As shown in FIG. 4B, the liquid concentration of the catalyst ink drop 40 flattens out from the center 70 to the perimeter 72 along arrow A due to a combination of the centrifugal forces created by rotation and the surface tension. The evaporating flux B becomes more uniform along the catalyst ink drop 40 as the liquid concentration along the catalyst ink drop 40 is more uniform. The liquid of the catalyst ink drop 40 evaporates at a more uniform rate, creating a uniform catalyst film and thus a rotating disk electrode 12 that will produce accurate catalyst activity test results that can be accurately reproduced.

Figure 5A:
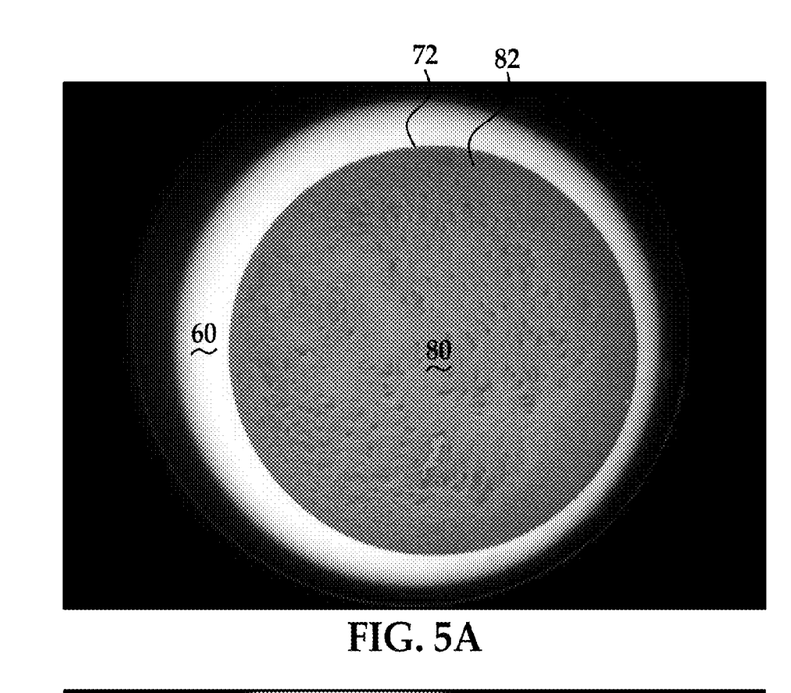
FIG. 5A is a top plan view of a rotating disk electrode having a catalyst film prepared in a stationary environment.
Figure 5B:
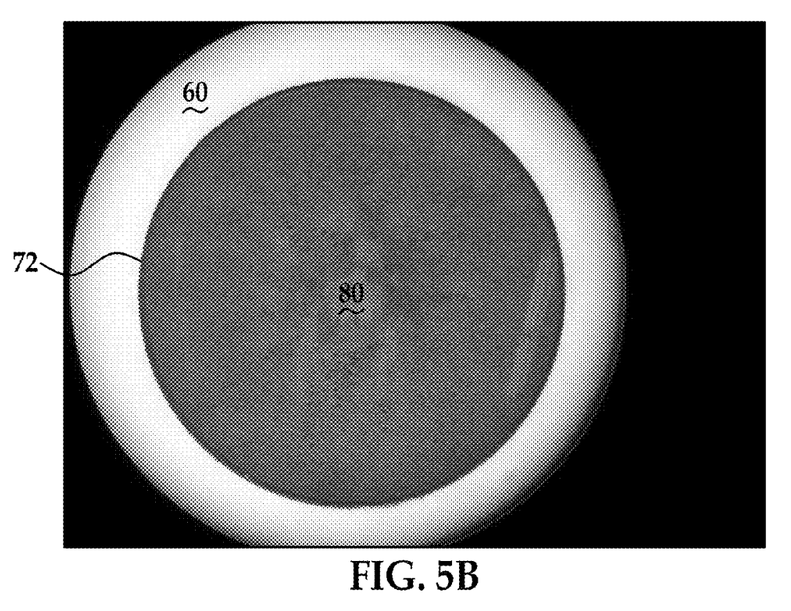
FIG. 5B is a top plan view of a rotating disk electrode having a catalyst film prepared in a rotating environment.

FIG. 5A shows a catalyst film 80 produced using the conventional stationary drying. The darker area 82 toward the perimeter 72 represents a thicker area of catalyst particle build up on the disk electrode 50. FIG. 5B shows a catalyst film 80 produced using an apparatus disclosed herein. The catalyst film is more uniform in color, representing uniformity in the catalyst particles across the surface of the disk electrode 50.

Figure 6:
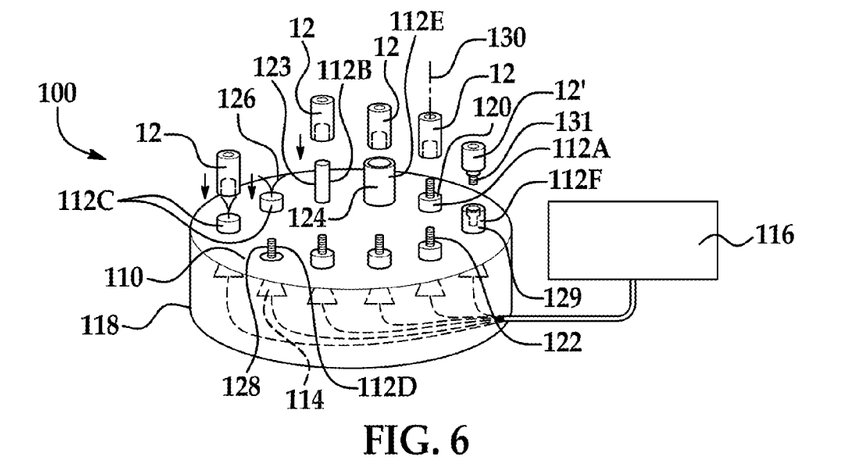
FIG. 6 is a perspective view of an embodiment of an apparatus for preparing a rotating disk electrode as disclosed herein.

An apparatus 100 for preparing rotating disk electrodes 12 is shown in FIG. 6. The apparatus 100 includes a base 110 on which a plurality of disk mounts 112A-F is positioned. Each disk mount 112 A-F is associated with a motor 114. A controller 116 individually controls each of the motors 114. The base 110 illustrated in FIG. 6 is provided as a non-limiting example. The shape of the base 110 can be different than that shown. The base 110 can enclose the motors 114 or can expose the motors 114. The base 110 can have any number of legs or can have a continuous wall 118 of support as shown. The wall 118 can have a door that can be used to access the motors 114 if desired. The base 110 can be made out of any material suitable to provide the necessary support for the disk mounts 112 A-F and the motors 114, such as metal or plastic. The base 110 can be transparent or opaque.

The disk mounts 112 A-F are configured to attach to a rotating disk electrode 12, an example of which is shown in FIG. 2. Referring to FIG. 2, the rotating disk electrode 12 has a recess 62 in its end 64 opposite the disk electrode 50. The recess 62 is configured to attach the rotating disk electrode 12 to the testing apparatus, such as that shown in FIG. 1. As a non-limiting example, in FIG. 2, the recess 62 is threaded to screw onto a corresponding threaded member of the testing apparatus 10.

In FIG. 6, different configurations of disk mounts 112 A-F are shown as non-limiting examples of attachment configurations for the rotating disk electrodes 12. Disk mount 112A has a support 120 on which a threaded portion 122 is positioned. This threaded portion 122 corresponds to the threaded recess 62 shown in FIG. 2. The rotating disk electrode 12 is screwed onto the threaded portion 122 such that the rotating disk electrode 12 will rotate with the disk mount 112A. Disk mount 112B is a base 123 onto which the rotating disk electrode 12 can be fitted for a friction fit. The friction fit should be sufficient to move the rotating disk electrode 12 as the disk mount 112B is rotated. Disk mounts 112C are configured with outwardly biased tongs 126. These tongs 126 are pressed together and inserted into the recess 62 of the rotating disk electrode 12, which is then slid over the tongs 126 until fully inserted. The tongs 126 are sufficiently biased in opposing outward directions so that when inside the recess 62, they contact the wall of the recess 62 with sufficient force to rotate the rotating disk electrode 12 with the disk mount 112 A-F. Disk mount 112D is a threaded mount 128 extending from the corresponding motor 114 and sized to correspond to the threaded recess 62 of the rotating disk electrode 12. Disk mount 112E is a sleeve 124 into which the rotating disk electrode 12 can be inserted for a friction fit. Disk mount 112F is a female threaded portion 129 configured to receive a male threaded portion 131 of a rotating ring disk electrode 12'. The apparatus 100 shown has different types of disk mounts 112 A-F for illustration. However, all of the disk mounts 112 A-F on a base 110 can be of the same configuration. In addition, the number of disk mounts 112 A-F illustrated is not meant to be limiting. Any number of disk mounts 112 A-F of any configuration (112A-F) can be incorporated into an apparatus 100 as desired or required.

The disk mounts 112 A-F are configured so that the corresponding rotating disk electrode 12 is attached to the disk mount 112 A-F with the central axis 130 of the rotating disk electrode 12 as the center of rotation of the disk mount 112 A-F. For example, threaded portion 122 is positioned on support 120 of disk mount 112A such that the central axis 130 of the threaded portion 122 is the axis of rotation of the rotating disk electrode 12 that is positioned on the disk mount 112A. The disk mounts 112 A-F can be configured to receive different types and sizes of rotating disk electrodes 12, including rotating ring disk electrodes for example, having a central axis 130 about which the rotating disk electrode 12 can be rotated.

The controller 116 is configured to control operation of each of the motors 114 individually so that one or more of the disk mounts 112 A-F can be rotated at a time, with each rotating disk mount 112 A-F rotating at an individually selected rate. However, in alternative embodiments the controller 116 may be configured to operate subgroupings of the plurality of motors 114. For example, the controller 116 may control all motors 114 in a subgroup at the same speed.

In operation of the apparatus 100, one or more rotating disk electrodes 12 are prepared by placing a catalyst ink drop 40 on the disk electrode 50. Different types of catalyst ink can be used to concurrently prepare the desired number of rotating disk electrodes 12 for each type of catalyst. Typically, the rotating disk electrode 12 will be attached to its respective disk mount 112 A-F prior to adding the catalyst ink drop 40. The controller 116 then operates each of the motors 114 associated with a disk mount 112 A-F having a rotating disk electrode 12 attached. Each of the motors 114 rotates its respective disk mount 112 A-F, thereby generating the centrifugal force that alters the shape of the catalyst ink drop 40. As noted above, the combination of the centrifugal force and surface tension between the catalyst ink drop 40 and the disk electrode 50 creates a more uniform evaporation flux across the entire surface, which, in turn, results in a catalyst film 80 with relatively uniform thickness and relatively few surface irregularities.

The magnitude of the centrifugal force generated is proportional to the rate of rotation of the motor. Therefore, the individual rotation speed at which an individual motor 114 is set depends on the catalyst ink being used to prepare the rotating disk electrode 12. For example, the amount of liquid in the catalyst ink drop 40 can change the required rotational speed of the motor 114 necessary to balance the centrifugal force with the surface tension of the drop 40. As another example, the viscosity of the catalyst ink can also change the required rotational speed of the motor 114 necessary to balance the centrifugal force with the surface tension of the drop 40. If the controller 116 is set to control a motor 114 at too low of a rate of rotation, the centrifugal force may be insufficient to overcome the surface tension responsible for shaping the catalyst ink drop 40. Conversely, if the rate of rotation is too high, the centrifugal force generated may overcome the surface tension and push the catalyst ink drop 40 off of the disk electrode 50. Consequently, based on ink viscosity and disk loading, the optimal individual rate of rotation for each of the plurality of motors 114 typically varies between 700-1200 rotations per minute (RPM).

Figure 7:
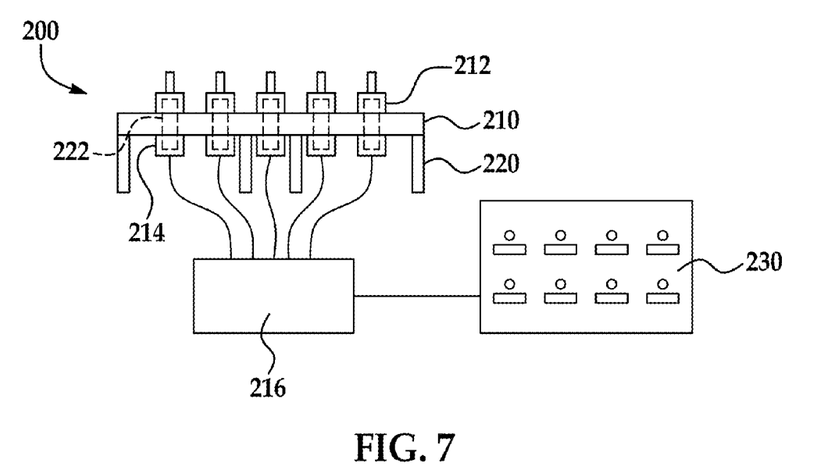
FIG. 7 is a side view of another embodiment of an apparatus for preparing a rotating disk electrode as disclosed herein.

FIG. 7 illustrates an apparatus 200 for preparing rotating disk electrodes 12 having a base 210 with a plurality of disk mounts 212 each connected to a respective motor 214. In this embodiment, the base 210 is supported by legs 220, the number of which is provided as an example only. As depicted, a shaft 222 passing through an aperture in the base 210 serves to mechanically couple a respective disk mount 212 and motor 214 so that each disk mount 212 rotates in relation to the rotation of the corresponding shaft 222. Alternatively, the coupling can be achieved without physical connection through magnetic coupling. Although FIG. 7 shows each of the motors 214 coupled to a single corresponding disk mount 212, alternative embodiments may couple one or more motors 114 with more than one disk mount 212.

The embodiments herein can also include a control panel 230, as shown in FIG. 7. The control panel 230 can communicate with the controller 216 and be configured to allow a user to control the operation of each motor 214 individually. For example, only a portion of the total motors 214 may be needed at one time. Each motor 214 can be individually turned on or off. The speed at which each motor 214 will operate can be individually set with the control panel 230. A length of time that each motor 214 will operate can also be set. Other settings can be programmed with the control panel 230 as contemplated by those skilled in the art. The control panel 230 can also be configured to display information to a user, such as indicating the motors 214 that are operating, the rotation speed of each of the motors 214, and the time period remaining for the operating motors 214.

Figure 8:
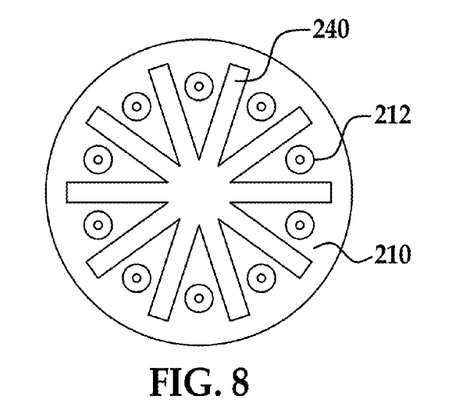
FIG. 8 is a top plan view of an aspect of an apparatus for preparing a rotating disk electrode as disclosed herein.

While the catalyst ink drop 40 can be dried in air at room temperature, the apparatus 100, 200 may further include a means for heating the base 110, 210, which can accelerate the drying process. FIG. 8 is a plan view of the base 110 or 210 illustrating the use of heat tape 240 as a means for heating the base 210. The location of the heat tape 240 is an example and is not meant to be limiting. While the means for heating the base 210 shown in FIG. 8 is heat tape 240, alternative means may be suitable. For example, a direct flame could heat the base 210, or if the base 210 is of a suitable material, it can convert electrical current into thermal energy.

Figure 9:
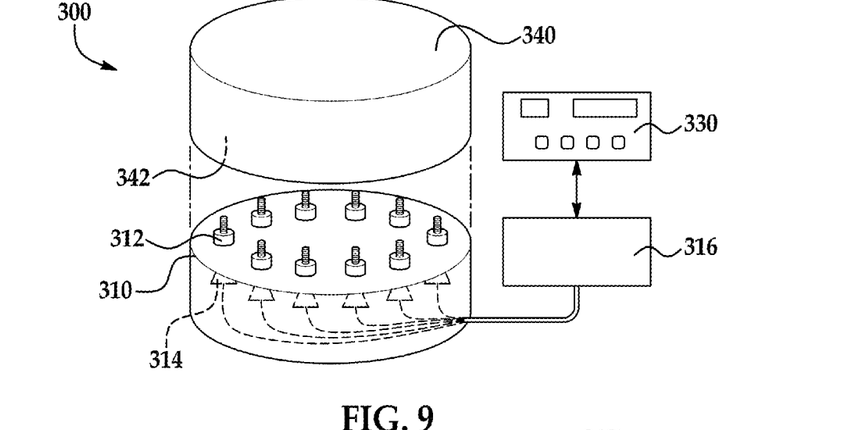
FIG. 9 is a perspective view of yet another embodiment of an apparatus for preparing a rotating disk electrode as disclosed herein.

The embodiments herein can further comprise a hood. As illustrated in FIG. 9, the apparatus 300 includes a base 310, disk mounts 312, corresponding motors 314, a controller 316 and a control panel 330. The apparatus 300 also includes a hood 340. The hood is configured to fit onto and in sealing engagement with the base 310, and includes a cavity 342 that can be sized to enclose all of the disk mounts 312 if each was fitted with a rotating disk electrode 12. Alternatively, the hood 340 can have a plurality of individual cavities 342, each sized to receive one rotating disk electrode 12 attached to a disk mount 312. The hood 340 can have a gas inlet 344, a gas outlet 346 and a gas supply 348, as does the hood 340' shown in FIG. 10. The gas inlet 344 and gas outlet 346 can be located on the hood 340' in relation to each other in any location that provides adequate gas flow through the cavity 342. The gas supply 348 is coupled with the gas inlet 344, and a gas regulator 350 may be provided to regulate the flow of gas into the cavity 342 of the hood 340'. The flow should be low enough so as not to disturb the catalyst ink drop 40 on the disk electrode 50 but high enough to promote drying of the catalyst ink drop 40. The turbulence formed at high flow rates can interfere with the drying process, so in order to create a controlled and uniform drying environment the flow rate should be kept to a minimum and steadily maintained.

Figure 10:
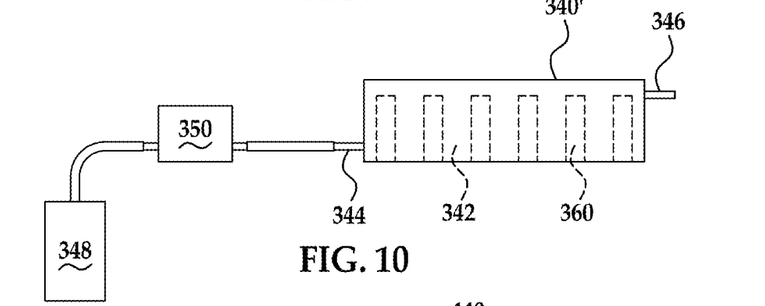
FIG. 10 is a side view of an aspect of an apparatus for preparing a rotating disk electrode as disclosed herein.

Although the gas supply 348 used can be air or heated air, some types of catalyst may undergo oxidation. This oxidation will occur with air drying with no additional gas supply as well. While the oxides can be removed after drying, the use of a dry inert gas as the gas supply 348 has the benefit of providing a drying environment that reacts minimally with the catalyst. Nitrogen, argon and helium are commonly used for this purpose, but any gas that does not interact with the catalyst is suitable.

Because the drying process is expedited by heating the drying environment, the hood 340, 340' may further include a means for heating the hood 340, 340' as described with respect to the base 310. One or both the hood 340, 340' and base 310 can be heated. FIG. 10 illustrates the use of heat tape 360 as an example of a means for heating; however, alternative means may be suitable. For example, a direct flame could provide heat, or if the hood 340, 340' is of a suitable material, it can convert electrical current into thermal energy. The hood 340, 340' is commonly made from glass, metal, Teflon or fiberglass, but other materials may be suitable. If the material is transparent, like glass or fiberglass, the drying status can be visually observed throughout the process. However, certain materials may be unsuitable because they warp or discolor in the drying process due to certain chemicals in the catalyst ink drop 40 mixture.

Figure 11:
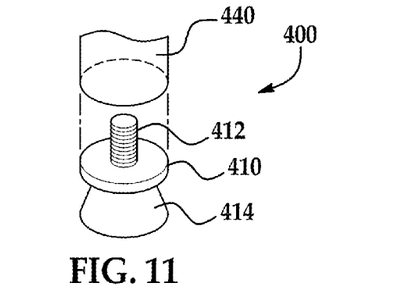
FIG. 11 is a perspective view of another embodiment of an apparatus for preparing a rotating disk electrode as disclosed herein.

Other embodiments of the apparatus to prepare rotating electrodes are contemplated herein. For example, as shown in FIG. 11, the apparatus 400 can comprise a base 410 and a motor 414 having a threaded disk mount 412, which can be the shaft of the motor 414, extending through the base 410 and sized to receive the threaded recess 62 of a rotating disk electrode 12. A hood 440 can be configured to sealingly engage the base 410 and be sized to accommodate the rotating disk electrode 12 when fitted on the threaded disk mount 412. The motor 414 can sit directly on a surface or can be housed within the base 410 as in FIG. 6. The disk mount 412, base and hood can include any of the alternative embodiments discussed herein.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for preparing rotating disk electrodes comprising:
   a base having a surface;
   a plurality of disk mounts attached to the surface of the base, each disk mount comprising a threaded receiving member over which a respective rotating disk is configured to be positioned, the threaded receiving member having a central axis that is configured to align directly with a central axis of the respective rotating disk;
   a plurality of motors each coupled to a corresponding one of the plurality of disk mounts and configured to rotate the corresponding one of the plurality of disk mounts about the central axis; and
   a controller configured to individually operate each of the plurality of motors.

2. The apparatus of claim 1 further comprising:
   a control panel in communication with the controller and configured to allow selection of an individual rotation speed for each of the plurality of motors at which the corresponding one of the plurality of disk mounts will rotate.

3. The apparatus of claim 2, wherein the individual rotation speed for each of the plurality of motors is each between 700 and 1200 RPM.

4. The apparatus of claim 1, wherein each of the threaded receiving member of each of the plurality of disk mounts has a male threaded portion corresponding to a female threaded portion of the respective rotating disk.

5. The apparatus of claim 4, wherein the male threaded portion of each of the plurality of disk mounts is aligned directly along the axis of rotation for the respective rotating disk.

6. The apparatus of claim 1 further comprising:
   a hood overlaying the based and having a cavity within which the plurality of disk mounts are located;
   a gas inlet located on the hood to fill the cavity within the hood with a gas;
   a gas outlet located on the hood; and
   a gas supply coupled to the gas inlet.

7. The apparatus of claim 6, wherein the hood is in sealing engagement with the base.

8. The apparatus of claim 6, wherein the gas supply is a dry inert gas.

9. The apparatus of claim 6 further comprising:
   means for heating at least one of the base and the hood.

10. The apparatus of claim 6, wherein the hood includes a plurality of cavities within each of which a corresponding one of the plurality of the disk mounts is located.

11. The apparatus of claim 1, wherein the plurality of disk mounts can be configured to receive various sizes of rotating disks.

12. An apparatus for preparing rotating disk electrodes comprising:
   a base having a surface;
   a disk mount attached to the surface of the base, the disk mount comprising a threaded receiving member over which a rotating disk is configured to be positioned, the threaded receiving member having a central axis that is configured to align directly with a central axis of the rotating disk;
   a motor coupled to the disk mount and configured to rotate the disk mount about the central axis;
   a hood overlaying and in sealing engagement with the base and having a cavity within which the disk mount is located;
   a gas inlet located on the hood to fill the cavity within the hood with a gas;
   a gas outlet located on the hood; and
   a gas supply coupled to the gas inlet.

13. The apparatus of claim 12 further comprising:
   a plurality of disk mounts attached to the base and located in the cavity;
   a plurality of motors each coupled to a corresponding one of the plurality of disk mounts and configured to rotate the corresponding one of the plurality of disk mounts; and
   a controller configured to individually operate each of the plurality of motors.

14. The apparatus of claim 13 further comprising:
   a control panel in communication with the controller and configured to allow selection of an individual rotation speed for each of the plurality of motors at which the corresponding one of the plurality of disk mounts will rotate.

15. The apparatus of claim 13, wherein the threaded receiving member of each of the plurality of disk mounts has a male threaded portion corresponding to a female threaded portion of the respective rotating disk.

16. The apparatus of claim 15, wherein the male threaded portion of each of the plurality of disk mounts is aligned along the axis of rotation for the respective rotating disk.

17. The apparatus of claim 12, wherein the gas supply is a dry inert gas.

18. The apparatus of claim 12 further comprising:
   means for heating at least one of the base and the hood.

19. The apparatus of claim 12, wherein the threaded receiving member is a vessel extending from the surface of the base with a cavity sized to frictionally receive the rotating disk.

20. The apparatus of claim 13, wherein the plurality of disk mounts are spaced on the surface of the base so that various widths of rotating disks can be received.

* * * * *